United States Patent
Fyffe

(10) Patent No.: US 10,062,191 B2
(45) Date of Patent: Aug. 28, 2018

(54) SYSTEM AND METHOD FOR RENDERING POINTS WITHOUT GAPS

(71) Applicant: Nurulize, Inc., Los Angeles, CA (US)

(72) Inventor: Graham Fyffe, Los Angeles, CA (US)

(73) Assignee: NURULIZE, INC., Los Angeles, CA (US)

( * ) Notice: Subject to any disclaimer, the term of this patent is extended or adjusted under 35 U.S.C. 154(b) by 3 days.

(21) Appl. No.: 15/472,227

(22) Filed: Mar. 28, 2017

(65) Prior Publication Data
US 2017/0278285 A1 Sep. 28, 2017

Related U.S. Application Data

(60) Provisional application No. 62/314,334, filed on Mar. 28, 2016.

(51) Int. Cl.
*G06T 11/40* (2006.01)
*G06T 11/00* (2006.01)

(52) U.S. Cl.
CPC ............ *G06T 11/40* (2013.01); *G06T 11/001* (2013.01)

(58) Field of Classification Search
CPC ....................................................... G06T 11/40
See application file for complete search history.

(56) References Cited

U.S. PATENT DOCUMENTS

| | | | | |
|---|---|---|---|---|
| 5,594,854 A | * | 1/1997 | Baldwin | G06T 11/40 345/441 |
| 6,275,622 B1 | * | 8/2001 | Krtolica | G06T 3/606 382/296 |
| 7,231,084 B2 | * | 6/2007 | Tang | H04N 1/646 348/E9.01 |
| 2010/0097389 A1 | * | 4/2010 | Lim | G06T 7/529 345/589 |
| 2010/0215266 A1 | * | 8/2010 | Higuchi | G06T 5/005 382/167 |
| 2011/0216065 A1 | * | 9/2011 | Liu | G06T 11/00 345/428 |
| 2015/0302115 A1 | * | 10/2015 | Cai | G06F 17/5004 703/1 |
| 2016/0343141 A1 | * | 11/2016 | Lin | G06T 7/11 |

* cited by examiner

*Primary Examiner* — Kee M Tung
*Assistant Examiner* — Grace Q Li
(74) *Attorney, Agent, or Firm* — Joseph J. Mayo; ARC IP Law, PC

(57) ABSTRACT

Various systems and methods disclosed herein are directed to rendering point-based graphics on a computing device with the spaces between points filled in with color to produce the appearance of surfaces without gaps or holes. According to one method, one or more rasterization passes are performed on an image space. One or more filling passes are performed on the pixels in the image space in which the spaces between the pixels are filled with color to form a contiguous surface in a new image plane. One or more blending passes are performed on the image space after the filling passes, in which wherein the color of a group of pixels is a blended together. A new image space is rendered from the image space in the image buffer.

8 Claims, 1 Drawing Sheet

SYSTEM AND METHOD FOR RENDERING POINTS WITHOUT GAPS

CROSS-REFERENCE TO RELATED APPLICATIONS

The present application claims the benefit of U.S. Provisional Patent Application Ser. No. 62/314,334, filed on Mar. 28, 2016, the entire disclosure of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

In computer graphics, point-based graphics has been utilized for model acquisition, processing, animation, and rendering. A particular challenge of point-based rendering relates to reconstructing continuous surfaces without holes as the point of view is altered. Various point-based rendering techniques have been developed to address this problem. While these techniques may be used to fill in holes in an image, the resultant solutions are not always practical or result in poor image quality.

SUMMARY

Various systems and methods disclosed herein are directed to rendering point-based graphics on a computing device with the spaces between points filled in with color to produce the appearance of surfaces without gaps or holes. According to one method, one or more rasterization passes are performed on an image space. The color attributes and color effects of the pixels in the image space are stored in an image buffer based on a first camera image plane. One or more filling passes are performed on the pixels in the image space in which the spaces between the pixels are filled with color to from a contiguous surface in a new image plane. One or more blending passes are performed on the image space after the filling passes, in which wherein the color of a group of pixels is a blended together. A new image space is rendered from the image space in the image buffer, wherein the new image plane is based on a second camera image plane, wherein the first and second camera image planes are different.

DETAILED DESCRIPTION

Briefly, and in general terms, various systems and methods disclosed herein are directed to rendering point-based graphics on a computing device, with the spaces between points filled in with color to produce the appearance of surfaces without gaps or holes. The system and methods disclosed herein provide improved performance for rendering large numbers of points with gap filling and more consistent performance over a wide range of point sizes.

Figure 1:
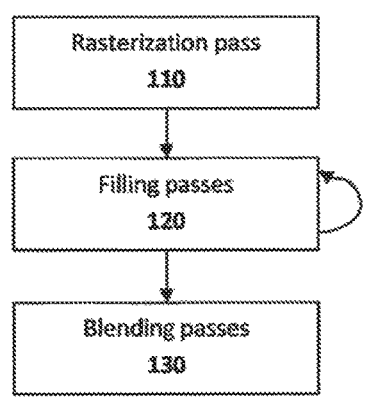
FIG. 1 is a flow diagram of one exemplary method for rendering points.

As shown in FIG. 1, one exemplary method for rendering point-based graphics includes the steps of performing one or more rasterization passes (110), performing one or more filling passes (120), and performing one or more blending passes (130).

In one embodiment, the system includes a graphics processing unit (GPU) running a software code. The software can store point attributes into an image buffer during one or more rasterization passes 110, including point color, and point geometry parameters, at a location determined by projecting a 3D point position into the image plane coordinates of a camera model. A GPU vertex shader and a GPU fragment shader can be used to project and store the point color and geometry parameters. The geometry parameters may include the 2D center of the point in image plane coordinates, the image space radius in the case of spherical point primitives, and additional parameters defining an ellipse in the case of ellipsoidal point primitives.

In an alternate method, the rasterization step may store texture UV coordinates instead of colors, or in addition to colors. Geometry parameters stored in the image buffers may include the original 3D parameters of the 3D point primitive or derived parameters based on the projection of the point primitive onto the camera image plane. In one variation, point attributes including colors and geometry parameters may be stored in a linear array, and indices of this array may be stored in the image buffer instead of the point attributes themselves. In another variation, 48-bit half-float red, green, blue values are stored in the image buffer during the rasterization step.

Figure 2:
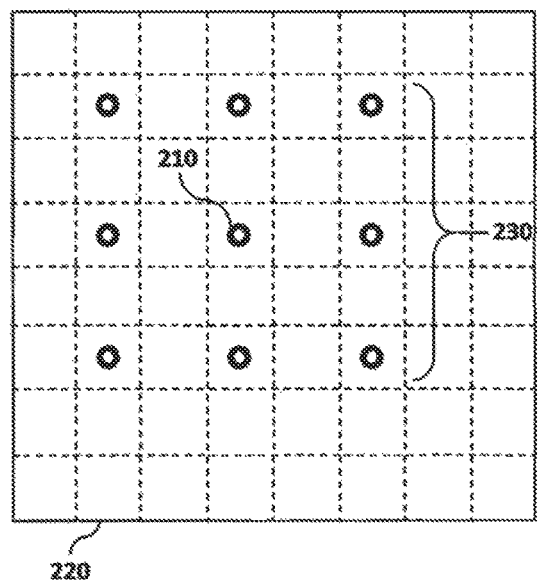
FIG. 2 is a diagrammatic representation of one embodiment of an image buffer.

After the rasterization passes, the GPU executes software that performs one or more filling passes 120 in image space. In one embodiment, a GPU fragment shader is used for the filling passes. Each filling pass visits each pixel site 210 in the image buffer 220 as shown in FIG. 2, computes updated geometry parameters at each pixel site, and stores the result in a second image buffer. The first and second image buffers may switch roles after each filling pass in an alternating fashion. The geometry parameters at a pixel site are updated by accessing the geometry parameters at the pixel site and its eight immediate neighbors on a grid 230, which may contain no geometry (e.g. zero radius), the same geometry parameters as the center pixel site, or different geometry parameters. The grid spacing may be one grid point per pixel, one grid point for every two pixels, or one grid point for every N pixels for some integer N. The grid spacing N in the first filling pass may be a power of two that is greater than the image space radius of the largest point primitive intended to be rendered, and the grid spacing may halve after each filling pass, so that geometry parameters are propagated larger distances in the image buffer in the first filling pass, and progressively shorter distances in subsequent filling passes, until finally a single pixel distance in the final pass. The geometry parameters at the center pixel site and its eight grid neighbors (as shown in FIG. 2) are tested for ray intersection using a ray passing through the center pixel site based on the camera model. The updated geometry parameters for the site are the geometry parameters that yielded, if any, the point of intersection closest to the position of the camera model, or the smallest depth value. The intersection may be computed approximately; for example, a spherical point primitive may be treated as a cone, disc, or truncated paraboloid closely approximating the sphere. After the filling passes are complete, the result is that every pixel site in the image buffer contains, approximately, the geometry parameters for the point primitive visible at the pixel site that is closest to the camera model or has the smallest depth value.

In an alternate method, the filling passes may propagate indices of a linear array of point attributes instead of propagating the attributes themselves. In another variation, the filling passes may propagate none, some, or all of the point attributes, in addition to an image buffer coordinate corresponding to a pixel site containing the remaining point attributes not propagated. In another variation, the image buffer coordinate and the point center attribute are one and the same.

Different neighborhoods may be accessed in the filling passes besides a regular grid containing the center pixel site and its eight grid neighbors, and different grid spacing schedules may be employed besides powers of two. In one variation, a larger grid consisting of the center pixel site and its twenty four neighbors in a five-by-five grid may be employed along with a powers-of-four grid spacing schedule. In another variation, filling passes may alternate between a one-by-three horizontal grid filling pass and a three-by-one vertical grid filing pass, using powers-of-two grid spacing that only halves after every two passes. Similar variations with even larger grids may be employed.

The GPU executes a blending pass 130 after the final filling pass. In one embodiment, a GPU fragment shader is used for the blending pass. The blending pass visits each pixel site 210 in the image buffer 220. The geometry parameters stored at the pixel site during the final filling pass 120 may be accessed, and the point center, if any, may be employed to access the point color information or other point attributes stored in the image buffer at a second pixel site containing the point center. In this way, point colors and other point attributes do not require propagation during the multiple filling passes, which improves the efficiency of the method. Point colors and attributes may be accessed in a similar fashion for the eight immediate neighbors to the pixel site. A final rendered color may be computed as a weighted blend of the up to nine accessed colors associated with up to nine point centers. The weight of a color in the blend may be inversely proportional to a monotonic function of the distance from the associated point center to the center of the pixel site, for example its square plus a small constant.

In an alternate method, the blending pass may smoothly interpolate colors or texture UV coordinates between point centers. Colors may be accessed from one or more texture maps based on the blended UV coordinates. In one variation, color effects are applied to the colors during the blending pass instead of during the rasterization pass.

In yet another method, all passes employ a GPU using vertex and fragment shaders. During the rasterization pass, colors are input as 48-bit half-float red, green, blue values, and the colors are then processed for color effects such as gamma, brightness, contrast, or color lookup tables. This color data is then stored in the image buffer as 24-bit red, green, blue values. The filling passes employ power-of-two grid spacing, from a user specified maximum power of two, halving each pass until the final pass uses a grid spacing of one. During the filling passes, the only geometry parameters that are propagated are the 2D point centers, which correspond to image buffer coordinates. The other geometry parameters are accessed when needed from the pixel site corresponding to the point center. In the blending pass, the monotonic weighting function is the square of the distance from the associated point center to the center of the pixel site plus a small constant.

The various methods and embodiments may be implemented on an exemplary system that includes at least one host processor that is connected to a communication bus. The system includes a main memory. The main memory may store software (control logic) and data. In one embodiment, the main memory may be in the form of random access memory (RAM).

The system may also include a graphics processor and a display (e.g., a computer monitor). In one embodiment, the GPU includes one or more shader modules, rasterization modules, or other modules known or developed in the art. Each of these modules may be positioned on a single semiconductor platform to form a graphics processing unit (GPU).

As those skilled in the art will appreciate, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Alternatively, the various modules may also be situated separately or in various combinations of semiconductor platforms. The system may also be realized by reconfigurable logic which may include (but is not restricted to) field programmable gate arrays (FPGAs).

The system may also include a secondary storage that includes, for example, a hard disk drive and/or a removable storage drive, representing a floppy disk drive, a magnetic tape drive, or a compact disk drive. The removable storage drive reads from and/or writes to a removable storage unit in a manner known in the art.

Computer programs, or computer control logic algorithms, may be stored in the main memory and/or the secondary storage. The computer programs, when executed, enable the system to perform various functions. The main memory, secondary storage, volatile or non-volatile storage, and/or any other type of storage are possible examples of non-transitory computer-readable media.

In one embodiment, the architecture and/or functionality of the various disclosed system may be implemented in the context of the host processor, graphics processor, or an integrated circuit that is capable of at least a portion of the capabilities of both the host processor and the graphics processor, a chipset (i.e. a group of integrated circuits designed to work and sold as a unit for performing related functions, etc.), and/or any other integrated circuit for that matter.

In yet another embodiment, the architecture and/or functionality of the various disclosed systems may be implemented in the context of a general computer system, a circuit board system, a game console system dedicated for entertainment purposes, an application-specific system, and/or any other desired system. For example, the system may take the form of a desktop computer, laptop computer, and/or any other type of logic. Still yet, the system may take the form of various other devices including, but not limited to a personal digital assistant (PDA) device, a mobile phone device, or the like.

In the various disclosed embodiments, the system may be coupled to a network (e.g., a telecommunications network, local area network (LAN), wireless network, wide area network (WAN) such as the Internet, peer-to-peer network, or cable network) for communication purposes.

The various embodiments described above are provided by way of illustration only and should not be construed to limit the disclosed invention. Those skilled in the art will readily recognize various modifications and changes that may be made to the disclosed invention without following the example embodiments and applications illustrated and described herein, and without departing from the true spirit and scope of the disclosed invention.

What is claimed is:

1. A method for rendering point-based graphics on a computer, the method comprising:

storing point attributes of an image space into an image buffer during one or more rasterization passes at a location determined by projecting a three-dimension point position into the image plane coordinates of a camera image plane;

performing one or more filling passes on the point attributes of the image space, wherein each filling pass of said one or more filling passes
        visits each pixel site in the image buffer,
        computes updated geometry parameters at each pixel site, and
        stores the updated geometry parameters in a second image buffer; and performing a blending pass after the one or more filling passes on each pixel site in the image buffer, wherein the updated geometry parameters for each pixel from the second image buffer are applied to each pixel; and rendering a new image space based on the image buffer after the filling and blending passes.

2. The method of claim 1, wherein the point attributes are point colors.

3. The method of claim 1, wherein the point attributes are texture UV coordinates.

4. The method of claim 1, wherein the point attributes are point geometry parameters.

5. The method of claim 1, wherein the updated geometry parameters include a 2D center of a point in image plane coordinates, image space radius for spherical point primitives, or additional parameters defining an ellipse for ellipsoidal point primitives.

6. The method of claim 1, wherein computing the updated geometry parameters comprises: accessing geometry parameters for eight immediately adjacent pixels to each pixel site and determining whether there is ray intersection between each pixel site and any of the eight immediately adjacent pixels.

7. The method of claim 6, wherein the blending pass further comprises blending colors from each pixel site and the eight immediately adjacent pixels.

8. The method of claim 6, further comprising applying color effects to the pixels in the image space stored in the image buffer.

* * * * *